US012783934B2

(12) United States Patent
Campbell et al.

(10) Patent No.: US 12,783,934 B2
(45) Date of Patent: Nov. 3, 2026

(54) MEASURING QUANTUM OPERATORS

(71) Applicant: RIVERLANE LTD, Cambridge (GB)

(72) Inventors: Earl Campbell, Cambridge (GB); Gyorgy Geher, Cambridge (GB); Ophelia Crawford Clarke, Cambridge (GB)

(73) Assignee: RIVERLANE LTD, Cambridge (GB)

( * ) Notice: Subject to any disclaimer, the term of this patent is extended or adjusted under 35 U.S.C. 154(b) by 87 days.

(21) Appl. No.: 19/099,449

(22) PCT Filed: Jul. 26, 2023

(86) PCT No.: PCT/GB2023/051977
§ 371 (c)(1),
(2) Date: Jan. 28, 2025

(87) PCT Pub. No.: WO2024/261443
PCT Pub. Date: Dec. 26, 2024

(65) Prior Publication Data

US 2026/0044769 A1 Feb. 12, 2026

(30) Foreign Application Priority Data

Jun. 21, 2023 (GB) ..................................... 2309349

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ......... G06N 10/70; G06N 10/20; G06N 10/40
See application file for complete search history.

(56) References Cited

U.S. PATENT DOCUMENTS 11,194,659 B2 * 12/2021 Versluis .............. G06F 11/1076
12,008,438 B1 * 6/2024 Chamberland ........ G06N 10/00

FOREIGN PATENT DOCUMENTS

WO 2022/139881 A1 6/2022

OTHER PUBLICATIONS

UK Search Report mailed Feb. 23, 2024, in related UK Patent Application No. GB 2309349.5.
International Search Report and Written Opinion mailed Feb. 23, 2024, in related PCT Application No. PCT/GB2023/051977.

* cited by examiner

*Primary Examiner* — Albert Decady
*Assistant Examiner* — Kareem Fuad Alhwamdeh
(74) *Attorney, Agent, or Firm* — Maschoff Brennan

(57) ABSTRACT

Disclosed herein is a method of performing a compound stabiliser measurement operation in a quantum error correction procedure. The compound stabiliser measurement is performed by combining measurement outcomes associated with stabiliser components. The method allows high-weight stabiliser measurements to be performed on quantum processing units with uniform qubit layouts and degree-four connectivity.

13 Claims, 8 Drawing Sheets

MEASURING QUANTUM OPERATORS

FIELD OF THE INVENTION

The present disclosure relates to measuring stabiliser operators in quantum error correction schemes.

BACKGROUND

Many types of quantum hardware, such as most superconducting quantum computers, use a fixed qubit layout. This means that qubit locations and qubit connectivity cannot be changed without modification to the underlying hardware, which makes it impractical to dynamically modify qubit arrangements during a computation. In the context of error correction, it is typically preferable to use auxiliary qubits to measure stabilisers so that pairs of data qubits are not jointly acted upon and thus to reduce the spread of errors. Limited qubit connectivity thus makes measuring a long-range/high-weight stabiliser difficult. Specifically, qubit connectivity is generally limited to connections between no more than four qubits, which presents challenges when performing measurement operations involving more than four data qubits.

This fixed hardware arrangement with restricted qubit connectivity presents a challenge when performing fault-tolerant quantum computation. While some quantum computations can be performed using regular and fixed qubit arrangements, schemes for logical computations often require the introduction of irregular qubit connections and measurement operations involving six or more qubits.

There is a need for methods of scheduling and measuring these "high-weight" operators in a fault-tolerant manner.

SUMMARY OF THE INVENTION

According to a first aspect of the invention, there is provided a computer-implemented method of performing a compound stabiliser measurement operation in a quantum error correction procedure performed on a quantum computing system, wherein the quantum error correction procedure encodes a logical quantum state in a plurality of data qubits of the quantum computing system, wherein the compound stabiliser measurement comprises a plurality of stabiliser components each associated with a respective auxiliary qubit of the quantum computing system, the plurality of stabiliser components including first and second stabiliser components, wherein the first and the second stabiliser components comprise entangling operations, each entangling operation involving one data qubit of the plurality of data qubits and the respective auxiliary qubit associated with a respective one of the first and the second stabiliser components, wherein the entangling operations comprise pairs of non-commuting entangling operations, each pair of non-commuting entangling operations comprising a first entangling operation associated with the first stabiliser component and a second entangling operation associated with the second stabiliser component, wherein the method comprises, at a quantum processing unit (QPU): performing all of the entangling operations such that: for an odd number of pairs of non-commuting operations, the first entangling operation associated with the first stabiliser component is performed prior to the second entangling operation associated with the second stabiliser component; and for all other pairs of non-commuting operations, the first entangling operation associated with the first stabiliser component is performed subsequent to the second entangling operation associated with the second stabiliser component, subsequent to performing all of the entangling operations, measuring the respective auxiliary qubit associated with each of the plurality of stabiliser components to obtain a plurality of respective measurement outcomes; combining the plurality of respective measurement outcomes at a classical computing component of the quantum computing system to obtain a compound measurement outcome associated with the compound stabiliser measurement; and determining, at the classical computing component, a correction to the logical quantum state based on at least one respective measurement outcome of the plurality of respective measurement outcomes.

The method of the first aspect advantageously enables measurement of large compound stabiliser operators (e.g. involving greater than four data qubits) on quantum processing units limited connectivity (e.g. uniform/regular degree-four connectivity). Large stabiliser measurements are required by several fault-tolerant quantum computing schemes (such as lattice surgery), and the method of the first aspect therefore facilitates fault-tolerant quantum computation. Existing methods for fault-tolerant quantum computation generally require either complex operations involving e.g. SWAP gates (which lead to increase error rates on the data qubits) or require modification to the underlying hardware (e.g. increased qubit connectivity and/or local areas of non-uniformity). The method of the first aspect therefore provides a way to perform fault-tolerant quantum computation with reduced error rates on quantum processing units with uniform and limited qubit connectivity.

The method of the first aspect operates at the architecture level of the quantum computer (the error correction occurs at the architecture level and is independent of the data being processed/applications being run) and makes the quantum computer run more efficiently and effectively as a computer (due to reduced error rates compared to alternative schemes).

Performing the entangling operations associated with the first stabiliser component prior to the entangling operations associated with the second stabiliser component for an odd number of pairs of non-commuting gates (and vice-versa for the remaining non-commuting entangling gates) acts to entangle the auxiliary qubits associated with the first and second stabiliser components without directly applying any gate between them, thereby encoding a value for the compound stabiliser measurement across the two auxiliary qubits. Scheduling the gates in this way is contrary to established principles in quantum error correction that require non-commuting entangling gates be applied in such a way that evenly many of them are applied from one stabiliser before the other (see e.g. appendix A of Litinski and von Oppen, "*Lattice Surgery with a Twist: Simplifying Clifford Gates of Surface Codes*", arXiv:1709.02318v2 [quant-ph]).

Being associated with an auxiliary qubit means the stabiliser component is measured using the auxiliary qubit. In other words, the respective auxiliary qubit facilitates measurement of the respective stabiliser component.

A compound stabiliser is a stabiliser formed of multiple stabiliser components (also referred to as stabiliser subcomponents), and a compound stabiliser measurement operation is the act of measuring a compound stabiliser (i.e. by obtaining measurement values associated with each of the stabiliser components that form the compound stabiliser). The stabiliser components are not themselves stabilisers, but the product of the stabiliser components is a stabiliser. While the operations of the stabiliser components are performed in an interleaved fashion such that they do not commute, the stabiliser components as a whole (i.e. if they were not performed with interleaved/overlapping entangling gate schedules) are mutually commuting with each other.

Data qubits are physical qubits used to encode logical quantum states in the error correction procedure. The auxiliary qubits (sometimes referred to as syndrome qubits) are qubits used to facilitate measurement of stabilisers and stabiliser components.

Non-commuting operations are operations that do not commute, i.e. operations A and B for which AB≠BA.

Preferably, the method further comprises providing the compound measurement outcome to a decoding system of the quantum computing system (which may be a subcomponent of the classical computing component) for decoding errors on the plurality of data qubits. The compound measurement outcome provides a measurement value for the compound stabiliser and its value therefore forms part of the error syndrome for the data qubits. The decoding system uses the syndrome (which is based on measurement outcomes from multiple stabilisers/compound stabilisers) to decode errors on the data qubits.

Optionally, the plurality of stabiliser components may include a third stabiliser component, the third stabiliser component may comprise further entangling operations, each further entangling operation involving one data qubit of the plurality of data qubits and the respective auxiliary qubit associated with the third stabiliser component; the entangling operations and further entangling operations may collectively comprise further pairs of non-commuting entangling operations, each further pair of non-commuting entangling operations comprising a first further entangling operation associated with the first component and a second further entangling operation associated with the third stabiliser component, and the method may further comprise performing all of the further entangling operations such that: for an odd number of pairs of further non-commuting operations, the first further entangling operation associated with the first stabiliser component is performed prior to the second further entangling operation associated with the third stabiliser component; and for all other pairs of further non-commuting operations, the first further entangling operation associated with the first stabiliser component is performed subsequent to the second further entangling operation associated with the third stabiliser component.

In this way, larger compound stabiliser measurements can be performed (i.e. for stabilisers involving three or more stabiliser components); there is in principle no limit on the number of stabiliser components that can be combined using the method of the present invention, and therefore compound stabilisers of arbitrarily large size can be measured on uniform degree-four qubit layouts by using the method of the present invention.

Unlike approaches that require SWAP gates, the number of timesteps required to obtain a compound measurement outcome using the present invention is independent of size of the compound stabiliser.

Combining the plurality of respective measurement outcomes may comprise summing, at the classical computing component, the plurality of respective measurement outcomes. The sum may be the modulo 2 sum. The measurement outcomes may optionally be processed prior to summing them: for example, the measurement outcomes may be flipped (i.e. from 0 to 1 and vice-versa, or +1 to −1 depending upon the measurement labelling convention being used) depending upon the configuration of the compound stabiliser measurement.

Preferably, the data qubits and auxiliary qubits are arranged in a quantum processing unit having uniform degree-four connectivity. Connectivity refers to the structure of connections each qubit has to other qubits: degree-four connectivity means that each qubit in the bulk of the quantum processing unit (i.e. not at the edge of an array of qubits) is connected to four other qubits. Uniform means that the connectivity layout of is the same for all qubits in the bulk of the quantum processing unit (e.g. the layout has a 'unit cell' that is reproduced throughout the quantum processing unit, except at the edges). However, it should be understood that the method of the present invention can also be used to measure large compound stabiliser on devices having higher connectivity (e.g. for measuring stabilisers involving more than six qubits on a quantum processing unit having degree-six connectivity).

The quantum error correction procedure may be a stabiliser code, such as a surface code error correction procedure. The quantum error correction procedure may be a lattice surgery procedure (e.g. a lattice surgery procedure on a surface code).

The entangling operations may be two-qubit operations, such as controlled-X (CNOT) and controlled-Z (CPHASE) operations or logically equivalent operations.

The correction may comprise a Clifford operation, which may be a Pauli operation. A Pauli correction results from repeating all of the entangling operations after measuring the respective auxiliary qubits and subsequently repeating measuring of the respective auxiliary qubits, in which case the correction may be further based upon the repeated measurement outcomes. Pauli corrections are advantageous because they are easier to track classically (i.e. without needing to apply any correction to the data qubits). However, the method may optionally comprise applying all or part of the correction to the logical quantum state (i.e. to the data qubits).

According to a second aspect of the invention, there is provided a computer program product comprising instructions which, when the program is executed by a quantum computing system, cause the quantum computing system to carry out the method of the first aspect.

According to a third aspect of the invention, there is provided a (non-transitory) computer-readable storage medium having stored thereon the computer program product of the second aspect.

According to a fourth aspect of the invention, there is provided a quantum computing system comprising a control system communicatively coupled to a decoding system, wherein the quantum computing system is configured to perform the method of the first aspect.

The second, third and fourth aspect share all benefits of the first aspect, and any feature disclosed in combination with the first aspect may equally be combined with the second, third and fourth aspects.

BRIEF DESCRIPTION OF THE DRAWINGS

Examples of the present invention will now be described in detail with reference to the accompanying drawings, in which.

DETAILED DESCRIPTION

Figure 1:
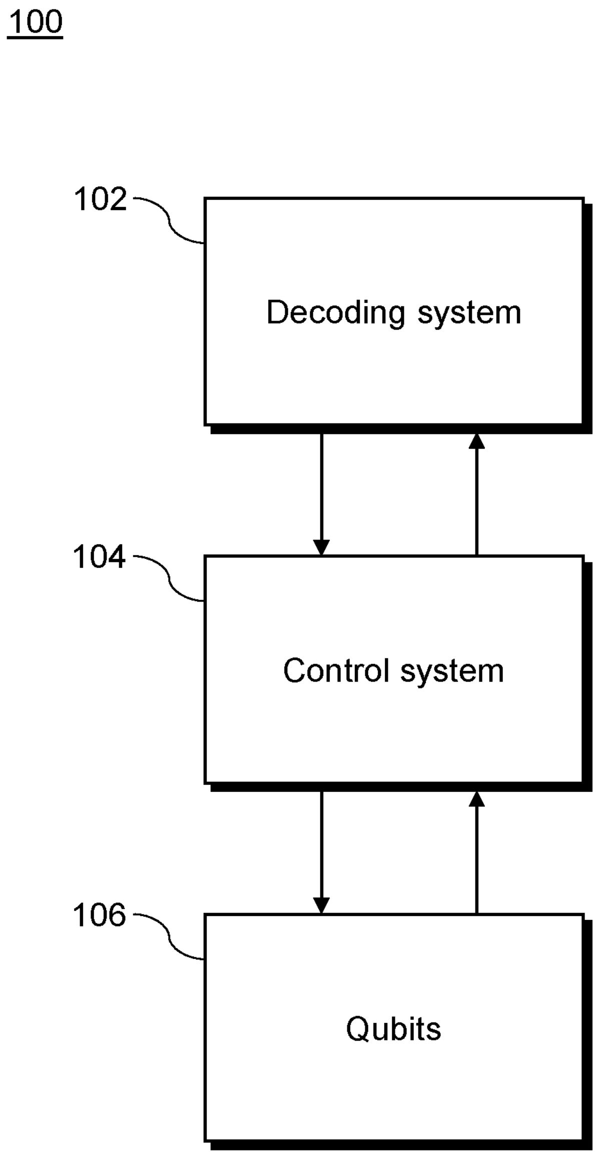
FIG. 1 is a schematic illustration of a quantum computing system.

For certain types of quantum hardware, e.g. superconducting quantum computers, the quantum processing unit (QPU) typically has its qubit layout and connectivity (which pairs of qubits can be acted on with a native two-qubit gate) permanently fixed (i.e. the user cannot change where qubits are located and which pairs of qubits can be acted upon with two-qubit gates). This layout will typically be uniform (so that it looks the same or very similar from all points) with a qubit connectivity of degree at most four (achieving a higher degree of connectivity is generally difficult due to increased crosstalk noise and other engineering challenges). However, existing methods for performing fault-tolerant logical quantum computation (e.g. using planar codes) typically require increased or modified connectivity of qubits in the QPU.

Qubits are unfortunately noisy, therefore running quantum algorithms without trying to detect and correct errors introduced during physical execution gives very unreliable results. The field of quantum error correction (QEC) offers a solution by introducing logical qubits that are encoded using several physical qubits. QEC makes it possible to correct physical errors, so algorithm outputs are more reliable than without error correction. One elegant approach to QEC uses stabiliser codes, where errors are detected by repeatedly measuring a set of stabilisers. One of the most popular types of stabiliser codes is surface codes. In particular, the planar surface code requires only low connectivity (degree-four), fits nicely on a planar architecture, and exhibits a relatively high error threshold compared to alternative schemes.

A prominent approach to fault-tolerant quantum computation with surface codes is the so-called Pauli-based computation model, in which the quantum computation is driven by sequences of multi-qubit Pauli measurements. At the logical level, Pauli quantum computation is performed using lattice surgery. For instance, in C. Chamberland, E. T. Campbell, "Universal quantum computing with twist-free and temporally encoded lattice surgery", arXiv:2109.02746 [quant-ph], the authors introduced so-called "dislocation" in the QPU which modifies the connectivity of the QPU and results in non-uniform qubit connectivity. These "dislocations" enable quantum computation using lattice surgery on a non-uniform QPU layouts, but no consideration is given to performing logical quantum computation efficiently using a uniform QPU layout. Others example include C. Chamberland, E. T. Campbell, "A circuit-level protocol and analysis for twist-based lattice surgery", arXiv:2201.05678 [quant-ph], in which the authors use a degree-six connectivity QPU to perform lattice surgery operations, and B. J. Brown, K. Laubscher, M. S. Kesselring, J. R. Wootton, "Poking holes and cutting corners to achieve Clifford gates with the surface code", arXiv:1609.04673 [quant-ph], which involves measuring non-rectangular shaped high-weight stabilisers.

Previous proposals to measure these irregular stabilisers have focused on changing the hardware either globally (by introducing additional connectivity) or locally (by changing the connectivity of the QPU at certain regions). The present disclosure provides a method for measuring high-weight stabilisers using a restricted connectivity device without modification to the underlying hardware, thereby enabling fault-tolerant quantum computation to be performed on QPUs that have uniform qubit arrangements and degree-four connectivity.

FIG. 1 shows a schematic of a quantum computing system 100 (also referred to as a quantum processing unit, QPU) comprising a control system 104 communicatively coupled to a decoding system 102 (also referred to as a decoder) and to a plurality of qubits 106. Unless indicated otherwise, reference to a "qubit" or "qubits" herein should be understood to refer to physical qubits (as opposed to logical qubits).

The qubits 106 may utilise any suitable qubit architecture, including (but not limited to) superconducting architectures, silicon architectures, photonic architectures etc. While the present disclosure refers primarily to qubits, any reference to qubits herein should be understood to also include qudits, i.e. quantum information units with more than two computational basis states (such as qutrits, which have three computational basis states).

The control system 104 is configured to send control signals to the qubits 106 for performing operations on the qubits 106 (such as logic gates and measurements) and to receive output signals from the qubits 106 (i.e. outputs of measurement operations performed on the qubits 106). The control system 104 may optionally be divided into additional subsystems, such as an algorithmic control subsystem responsible for high level processing (i.e. at the algorithmic level) and a physical control subsystem responsible for low level processing (e.g. converting algorithmic commands from the algorithmic control subsystem into qubit control pulses etc. and converting output signals from the qubits 106 into measurement values).

While the decoding system 102 and control system 104 are illustrated as being separate components, it should be understood that they could both be subcomponents of a single system. For example, the decoding system 102 and control system 104 could be hardware subcomponents of a single hardware system responsible for control and decoding. Alternatively, the decoding system 102 and control system 104 could be separate software components executed on a single hardware system (or across a distributed system). The term "classical computing component" will be used herein to refer to any apparatus capable of performing classical computations (such as a CPU, ASIC, FPGA etc.). It should be understood that classical computing components may include the decoding system 102 and/or the control system 104, in addition to any other apparatus/component of the quantum computing system 100 used to perform classical computations while a quantum computation is being performed on the quantum computing system 100.

In use, quantum computations are executed on the qubits 106 controlled by the control system 104. Due to the fragile nature of quantum information states, non-trivial quantum computations will generally require the use of quantum error correction. Myriad quantum error correction schemes have been proposed (Terhal, B. M. Quantum error correction for quantum memories. Rev. Mod. Phys. 87, 307-346 (2015)

provides a review of some of the most prominent quantum error correction schemes), and the present disclosure will focus primarily on surface codes, which are stabiliser codes that encode logical qubits in networks of physical qubits using topological properties that arise from the measurements used to obtain error syndromes. However, it should be understood that the teachings of the present disclosure can also be applied to other quantum error correction codes that involve measuring high-weight stabilisers (e.g. involving more than four data qubits).

Figure 2A:
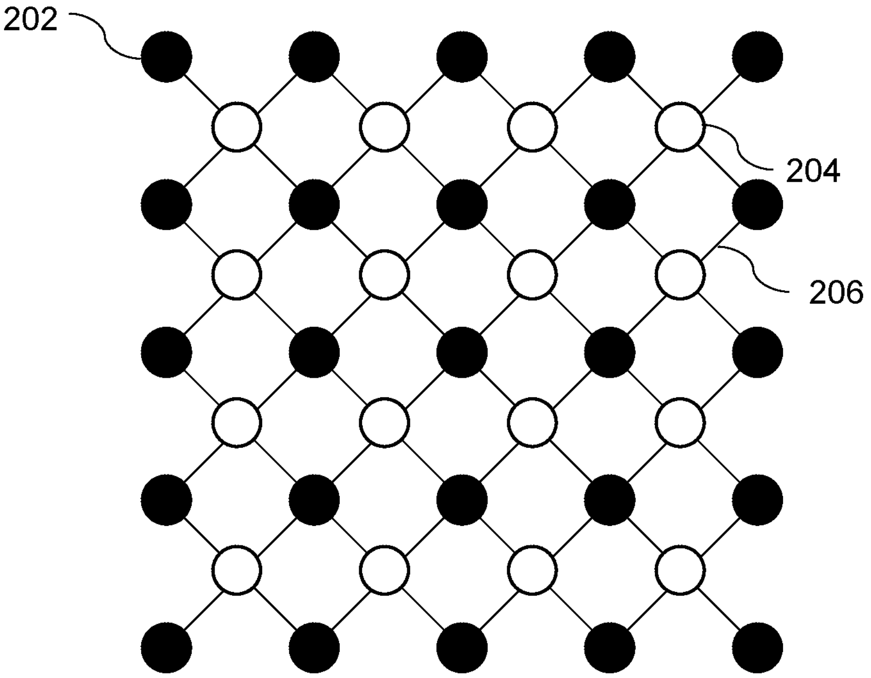
FIGS. 2*a* and 2*b* show quantum processor architectures having degree-four and degree-six qubit connectivity respectively.

FIG. 2*a* shows a QPU with degree-four connectivity. Data qubits 202 are represented by black dots, and auxiliary qubits 204 (i.e. qubits that are used to facilitate stabiliser measurements) are represented by white dots. Connections 206 between qubits are represented by lines.

The data qubits 202 are the physical qubits used to encode logical quantum states in quantum error correction procedures. The auxiliary qubits 204 are physical qubits used to facilitate stabiliser measurements in quantum error correction procedures. Connections between qubits enable entangling gates to be performed between the connected qubits. Examples of entangling gates include controlled-X gates (also referred to as CNOT gates) and controlled-Z gates (also referred to as CPHASE gates). Unless indicated otherwise, reference to X, Y and Z herein should be understood to refer to Pauli X, Y and Z operators.

The stabiliser measurement values obtained during the quantum error correction procedure provide a syndrome that is representative of errors on the data qubits 202. The syndrome is then provided to the decoding system 102, which analyses the syndrome and tracks errors and/or corrections. Often, it suffices to track the errors and/or corrections classically: it is not generally necessary to apply any corrections to the data qubits 202.

QPUs with degree-four connectivity are well-suited to performing fault-tolerant storage of quantum states using surface code quantum error correction (e.g. as a fault-tolerant quantum memory). However, QPUs with degree-four connectivity are less well suited to performing logical computations on the surface code using lattice surgery because such techniques generally require interaction between unconnected qubits.

Figure 2B:
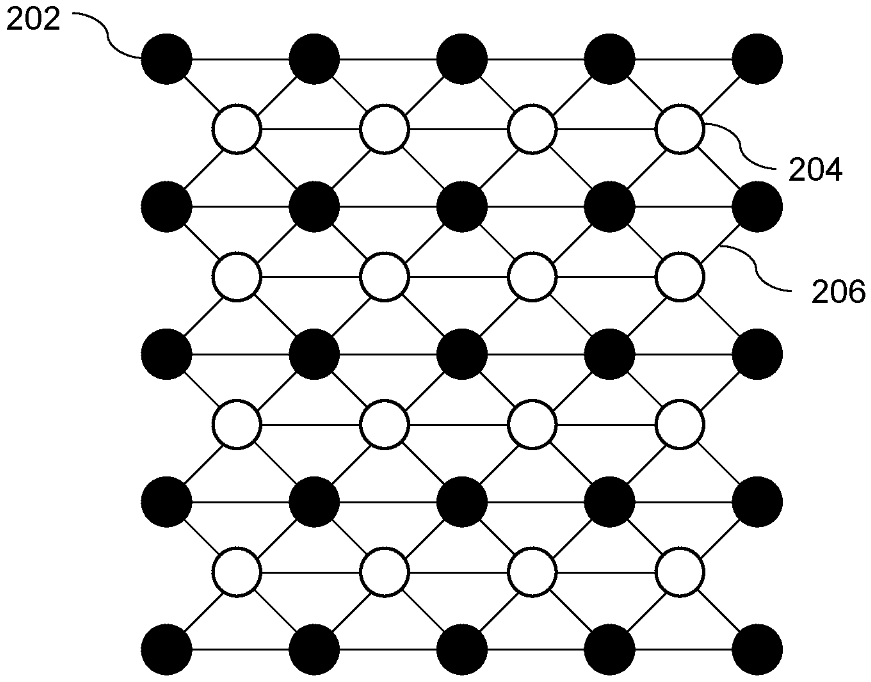

FIG. 2*b* shows a QPU with degree-six connectivity. This arrangement is slightly better suited to lattice surgery computation, but the additional connectivity generally leads to an increase in detrimental effects such as increased noise and crosstalk, thereby reducing qubit fidelity.

While the qubits 202, 204 in FIGS. 2*a* and 2*b* are illustrated in a regular array, it should be understood that alternative arrangements (such as irregular arrangements) could be used to achieve equivalent qubit connectivity. For example, the qubits 202, 204 could be physically separated and connected by transmission lines or similar.

The present disclosure focuses on performing high-weight and/or non-local stabiliser measurements (defined herein as stabiliser measurements that cannot be natively performed (without SWAP gates or equivalent) on the QPU in question using a single auxiliary qubit, i.e. when the data qubits involved in the stabiliser measurement are not connected to a single auxiliary qubit) on a QPU with degree four connectivity (i.e. the same as or similar to that in FIG. 2*a*). However, while the techniques described herein are especially beneficial in the context of QPUs having degree-four connectivity, one skilled in the art will appreciate that these techniques can also be applied when performing high-weight stabiliser measurements on devices having greater connectivity (e.g. degree-six or higher), such as the arrangement shown in FIG. 2*b*.

Figure 3:
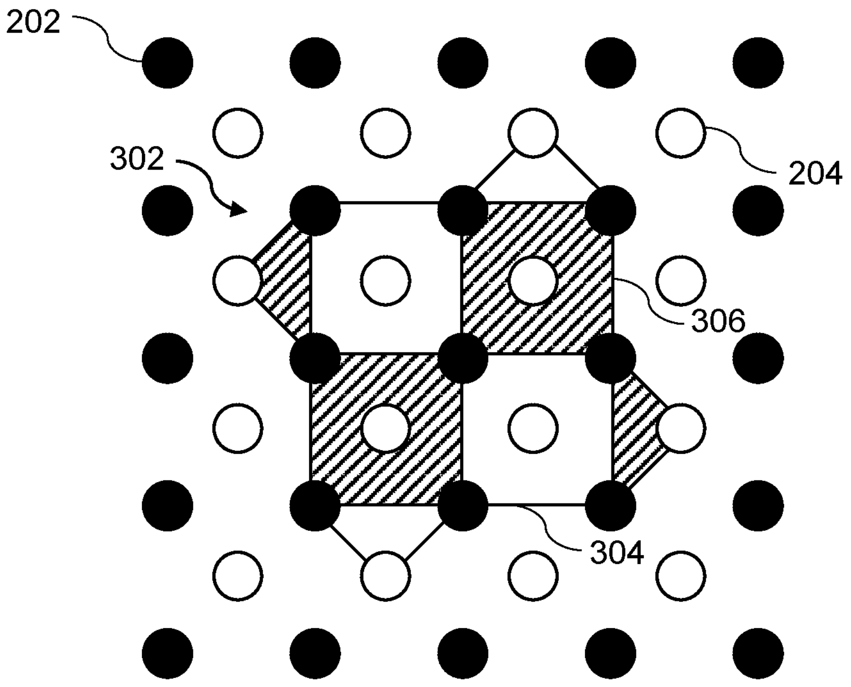
FIG. 3 shows a planar code.

FIG. 3. illustrates a planar code patch 302 on an array of physical qubits 202, 204. While it is often preferable that the physical qubits 202, 204 are arranged in a regular array, this is not essential to perform quantum computation using the planar code, and the qubits could alternatively have a different physical arrangement while still achieving the desired connectivity (e.g. degree-four connectivity or greater). The illustrated planar code patch encodes a single logical qubit and has distance three (i.e. a logical qubit error requires errors on at least three data qubits) and is in a configuration commonly referred to as the "rotated" planar code, which requires fewer physical qubits for a given code distance compared to "unrotated" planar codes.

The planar code patch 302 is formed of X-type stabilisers 304 (blank squares and triangles) and Z-type stabilisers 306 (hatched squares and triangles). The X-type stabilisers 304 involve joint Pauli-X measurements on the data qubits 202 at the vertices of the X-type stabilisers 304 (four data qubits 202 for the square stabilisers, and only two data qubits 202 for the triangular stabilisers because the third vertex is occupied by an auxiliary qubit 204). Similarly, the Z-type stabilisers involve joint Pauli-Z measurements on the data qubits 202 at the vertices of the Z-type stabilisers 306. Each stabiliser 304 is associated with a single auxiliary qubit 204 (either in the centre of the respective square, or at the third vertex of the respective triangle). Comparing the planar code patch 302 to the degree-four connectivity in FIG. 2*a*, it can be seen that the auxiliary qubit 204 of each stabiliser is connected to the data qubits 202 of that stabiliser. All of the stabilisers commute with each other.

Figure 4A:
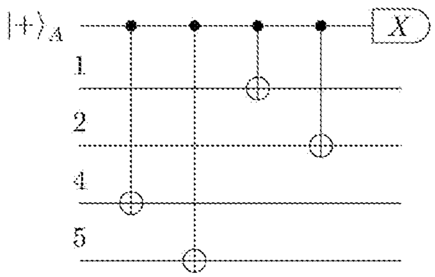
FIGS. 4*a* and 4*b* show exemplary circuits for planar code stabiliser measurement operations.
Figure 4B:
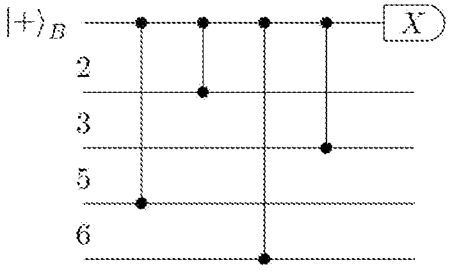

The auxiliary qubits 204 are used to measure the value of the stabilisers. FIGS. 4*a* and 4*b* show circuit for measuring the X-type stabilisers 304 and Z-type stabilisers 306 respectively. In both FIGS. 4*a* and 4*b*, the top qubits (labelled A and B respectively) represent the auxiliary qubits 204 associated with the respective stabiliser, and the other qubits (labelled 1-6) represent data qubits 202.

Figure 5:
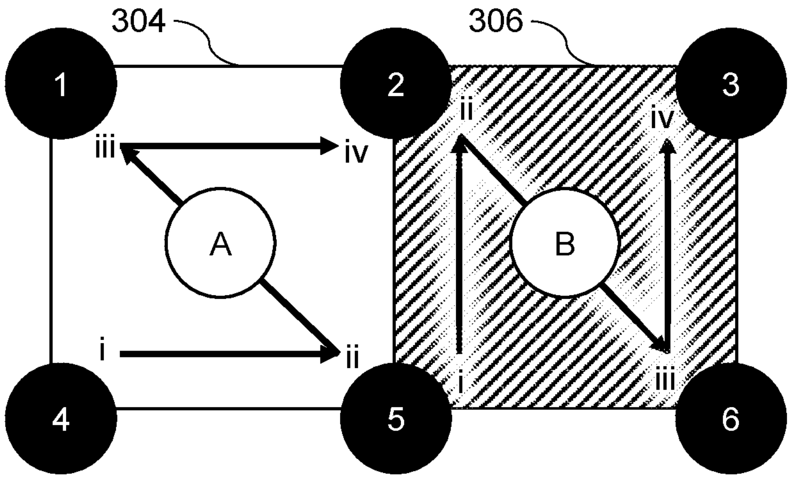
FIG. 5 shows an exemplary gate schedule for planar code stabiliser measurement operations.

The qubit labels in FIGS. 4*a* and 4*b* correspond to the qubit labels shown in FIG. 5, which shows the order in which the gates of FIGS. 4*a* and 4*b* can be performed to facilitate simultaneous measurement of the X-type stabilisers 304 and Z-type stabilisers 306 (referred to as the schedule). The Roman numerals i-iv represent timesteps of the two-qubit gates on FIGS. 4*a* and 4*b*. In the first step, a controlled-X gate is performed between auxiliary qubit A and data qubit 4, and a controlled-Z gate is performed between auxiliary qubit B and data qubit 5. The schedule then proceeds following the "Z-shaped" and "N-shaped" orderings depicted in FIG. 5, which ensures that the auxiliary qubits A and B do not become inadvertently entangled during the syndrome measurements.

The scheduling shown in FIG. 5 is not unique, and it is possible to use alternative gate schedules for measuring stabilisers (it is also possible to compile to other native gates, which may include operations other than controlled-Pauli gates). In general, scheduling simultaneous measurement of stabilisers using two-qubit gates requires the following conditions be fulfilled:

(a) the two-qubit gates have to be applied in such a way that in each timestep each data qubit is used only once; and (b) for each pair of stabilisers, the non-commuting entangling gates (N.B. controlled-Z and controlled-X gates do not commute) must be applied in such a way that evenly many of them are applied from one stabiliser before the other (non-commuting) entangling gate is applied from the other stabiliser on the same data qubit. In the example shown in FIG. 5, each of the two controlled-Z gates acting on qubits 5 and 2 from the Z-type stabiliser 306 is applied before the respective controlled-X gate from the X-type stabiliser 304.

Failure to obey condition (a) will lead to undefined behaviour due to simultaneous interactions with the same data qubit. Failure to obey condition (b) will lead to the auxiliary qubits associated with the two stabilisers becoming entangled. This will result in completely random and hence unreliable stabiliser measurement outcomes and could affect the logical qubit state encoded in the planar code patch 302. However, there are some scenarios in which it is impossible to find a suitable gate schedule on QPU that uses a fixed regular qubit layout with limited connectivity (e.g. a QPU with degree-four connectivity). For example, certain lattice surgery operations require the measurement of more complex stabilisers, and the only known way to measure these complex stabilisers on QPU with a fixed regular qubit layout is to perform additional entangling gates (such as SWAP gates) over additional timesteps, which results in increased error rates. However, this approach has the drawback that certain measurement operations must be staggered, and it also means that some stabilisers are measured less frequently than others. Overall, measuring high-weight stabilisers (i.e. those that cannot be natively measured on the QPU) leads to an increase in error rates due to slower, less reliable syndrome measurement and additional gates.

Figure 6A:
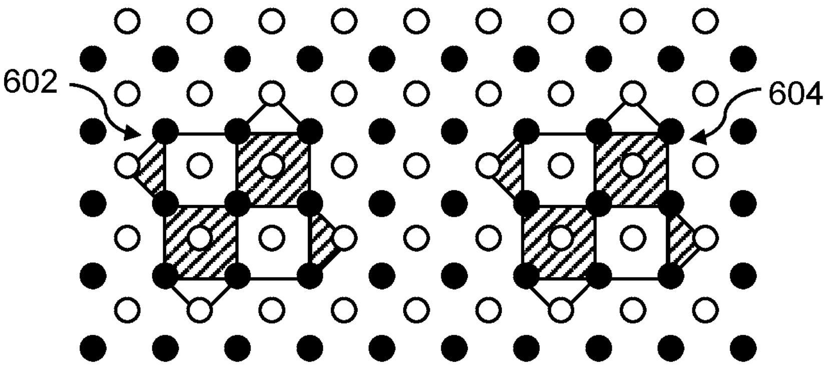
FIGS. 6*a-d* show a lattice surgery method according to the present disclosure.
Figure 6B:
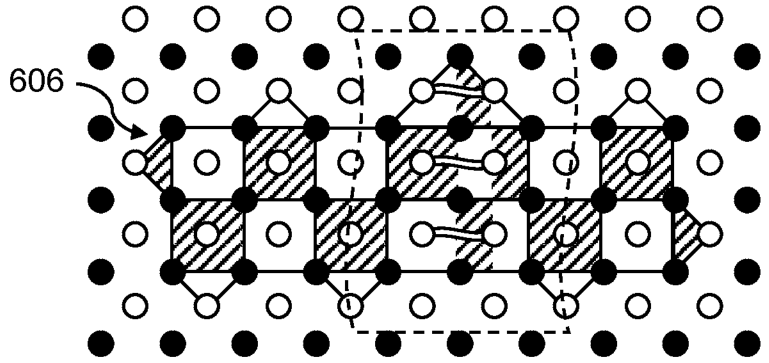

An example of such a lattice surgery operation is shown in FIGS. 6*a* and 6*b*. FIG. 6*a* shows a first planar code patch 602 and a second planar code patch 604. Each of these patches encodes a single logical qubit. Interaction between these logical qubits can be achieved by merging the individual planar code patches 602, 604 into a single larger planar code patch 606 as shown in FIG. 6*b*. In FIG. 6*b*, interstitial qubits between the first 602 and second 604 planar code patches (i.e. qubits that were previously not involved in any stabilisers) are incorporated into the planar code patches 602, 604 by measuring stabilisers such that the single larger planar code patch 606 is formed encoding a single logical qubit with a state that is dependent upon the states of the logical qubits encoded in the two original planar code patches 602, 604. One skilled in the art will appreciate that the details of how the patches are merged will depend upon the details of the calculation being performed; the illustrated example is merely intended to demonstrate the types of stabiliser that can arise from lattice surgery procedures (more information regarding lattice surgery operations can be found in various publications, such as Fowler and Gidney, "*Low overhead quantum computation using lattice surgery*", arXiv:1808.06709v4 [quant-ph]).

Figure 6C:
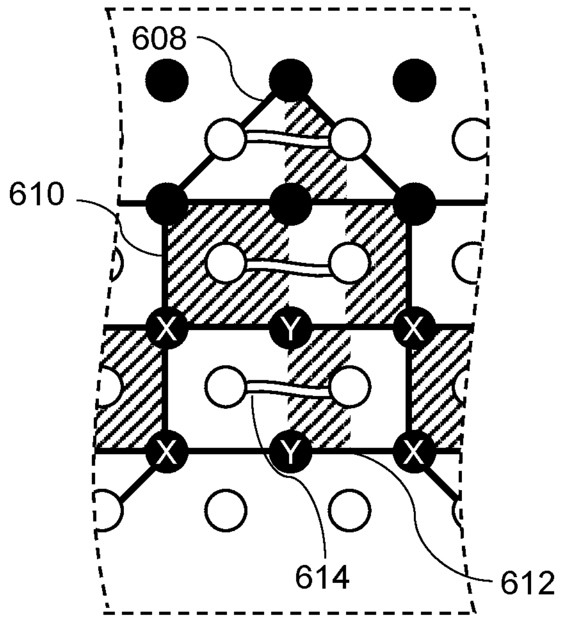

As shown in more detail in FIG. 6*c* (which shows an enlarged version of the dashed section of FIG. 6*b*), merging the planar code patches 602, 604 leads to the formation of irregular stabilisers 608, 610 and 612. As before, X-type stabilisers involve joint Pauli-X measurements on the data qubits 202 at the the vertices of the blank squares/rectangles/triangles, and Z-type stabilisers involve joint Pauli-Z measurements on the data qubits 202 at the vertices of the hatched squares/rectangles/triangles. However, each irregular stabiliser 608, 610, 612 involves data qubits that are at the vertices of both hatched and blank sections of that irregular stabiliser 608, 610, 612 (there are four such data qubits in FIG. 6*c*); the irregular stabilisers 608, 610, 612 involve Pauli-Y measurements on these data qubits that are at the vertices of both hatched and blank sections (i.e. a combination of Pauli-X and Pauli-Z operations). For example, as illustrated in FIG. 6*c*, the stabiliser 612 involves a joint Pauli XXYYXX measurement as indicated.

Existing approaches to measuring these irregular stabilisers generally require modification of the underlying hardware. However, the present inventors have recognised that the irregular stabilisers 608, 610, 612 can instead be measured on a uniform degree-four connectivity device using a similar scheduling to FIG. 5 by dividing the irregular stabilisers into separate stabiliser components (or subcomponents) each associated with a respective auxiliary qubit and then measuring the stabiliser components in a way that violates condition (b) above.

Figure 6D:
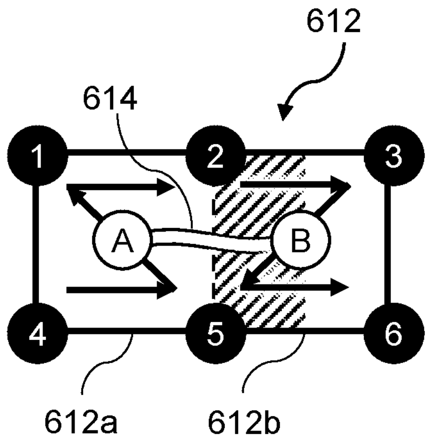

An example of such a scheduling is shown for the irregular stabiliser 612 in FIG. 6*d*. The irregular stabiliser 612 (also referred to as a compound stabiliser 612 to reflect the fact that it is formed of multiple components) is formed of a first stabiliser component 612*a* and a second stabiliser component 612*b*; the dashed line between these components represents that each component is measured separately.

The first stabiliser component 612*a* is associated with an auxiliary qubit 204 labelled A, and the second stabiliser component 612*b* is associated with a second auxiliary qubit 204 labelled B. The line 614 linking these two auxiliary qubits 204 indicates that the measurement outcomes of these auxiliary qubits 204 are combined classically when determining the measurement value of the component stabiliser 612.

Figure 7A:
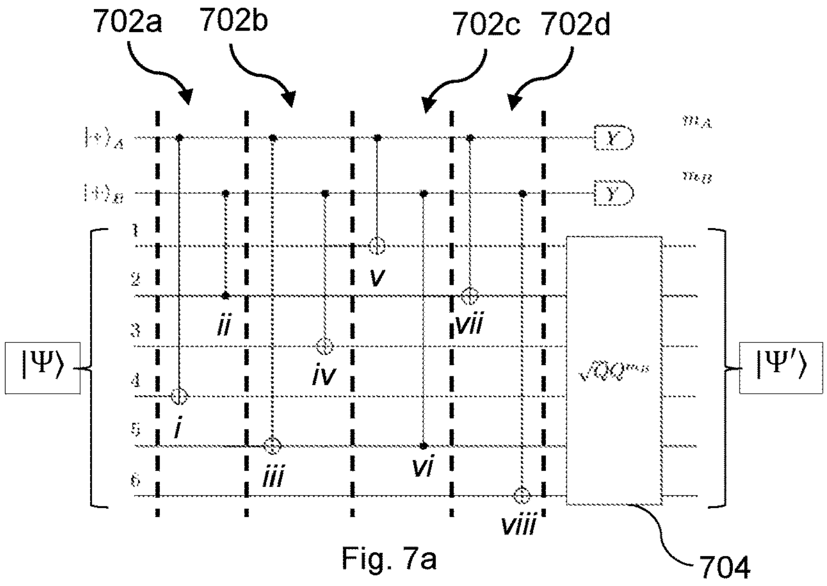
FIGS. 7*a-c* illustrate exemplary circuits for planar code stabiliser measurement according to the present disclosure.

The schedule illustrated in FIG. 6*d* is shown in more detail in FIG. 7*a*. The top two qubits in FIG. 7*a* are the two auxiliary qubits 204 labelled A and B in FIG. 6*d*, and the bottom six qubits in FIG. 7*a* correspond to the six data qubits 202 labelled 1-6 in FIG. 6*d*. The two-qubit gates between the auxiliary qubits 204 and the data qubits 202 are performed in four timesteps 702*a*-*d*. While the gates performed during each of these timesteps are illustrated sequentially for clarity in the circuit diagram, it should be understood that all gates within each timestep can be (and preferably are) performed simultaneously as per the ordering in FIG. 6*d*.

The two auxiliary qubits 204 are initiated in $|+\rangle$ states. In the first timestep 702*a*, a controlled-X gate (labelled i) is performed on data qubit 4 controlled by auxiliary qubit A, and a controlled-Z gate (labelled ii) is performed between data qubit 2 and auxiliary qubit B. In the second timestep 702*b*, a controlled-X gate (labelled iii) is performed on data qubit 5 controlled by auxiliary qubit A, and a controlled X gate (labelled iv) is performed on data qubit 3 controlled by auxiliary qubit B. In the third timestep 702*c*, a controlled-X gate (labelled v) is performed on data qubit 1 controlled by auxiliary qubit A, and a controlled-Z gate (labelled vi) is performed between data qubit 5 and auxiliary qubit B. In the fourth timestep 702*d*, a controlled-X gate (labelled vii) is performed on data qubit 2 controlled by auxiliary qubit A, and a controlled-X gate (labelled viii) is performed on data qubit 6 controlled by auxiliary qubit B.

Subsequent to the fourth timestep, the two auxiliary qubits are measured in the Y basis (it should be understood that this could be achieved numerous equivalent ways, e.g. by measuring the qubits directly in the Y basis or by performing a conjugate transpose phase gate ($S^\dagger$) followed by a Hadamard gate and measurement in the computational (Z) basis).

It can be seen that there are two pairs of non-commuting gates in the circuit used to measure the compound stabiliser 612: gate ii (associated with the second stabiliser component

612*b*) does not commute with gate vii (associated with the first stabiliser component 612*a*), and gate iii (associated with the first stabiliser component 612*a*) does not commute with gate vi (associated with the second stabiliser component 612*b*); all other pairs of gates in timesteps 702*a-d* commute.

It can also be seen that the gates in FIGS. 6*d* and 7*a* violate condition (b) above: the non-commuting entangling gates are applied in such a way that an odd number of them (i.e. one) are applied from the second stabiliser component 612*b* before the other (non-commuting) entangling gate from the first stabiliser component 612*a* is applied on the same data qubit: one gate is applied from the second stabiliser component 612*b* on data qubit 2 before the non-commuting entangling gate on data qubit 2 from the first stabiliser component 612*a*, whereas one gate is applied from the first stabiliser component 612*a* on data qubit 5 before the non-commuting entangling gate on data qubit 5 from the second stabiliser component 612*b*.

Put another way, for an odd number of pairs of non-commuting entangling operations, the entangling operation associated with the first stabiliser component 612*a* is performed prior to the non-commuting entangling operation associated with the second stabiliser component 612*b*, and for all other pairs of non-commuting operations, the entangling operation associated with the first stabiliser component 612*a* is performed subsequent to corresponding non-commuting entangling operation associated with the second stabiliser component 612*b*.

Performing the gate sequence in FIG. 6*d* and the Y-basis measurements on the auxiliary qubits A and B affects the logical state encoded by the data qubits 202 such that a correction is required. This correction is labelled 704 in FIG. 7*a* and is described in more detail below.

Figure 7B:
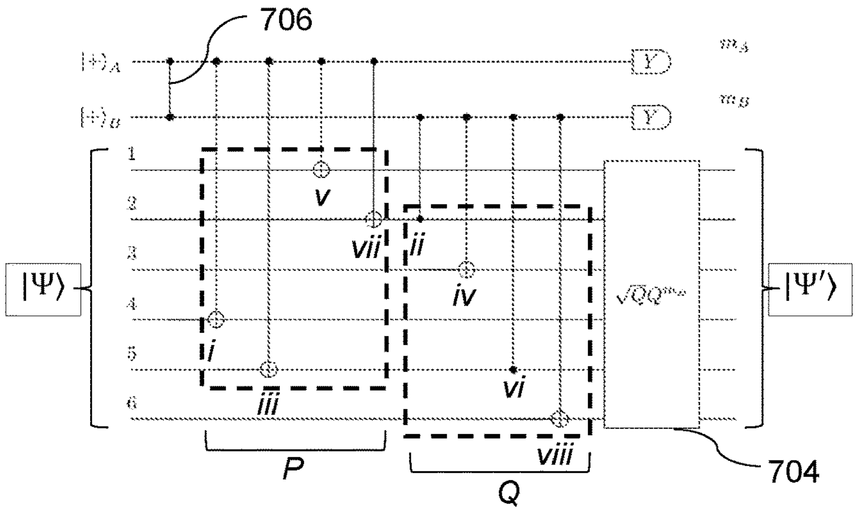

The circuit in FIG. 7*a* is logically equivalent to that shown in FIG. 7*b*. In FIG. 7*b*, the gates associated with each stabiliser component have been grouped together, which involves swapping the order of non-commuting gates ii and vii. As a consequence, a controlled-Z gate 706 is introduced between the two auxiliary qubits 204 (this controlled-Z gate 706 commutes with gates i-viii, so the order of this controlled-Z gate 706 relative to gates i-viii is immaterial). This controlled-Z gate 706 effectively acts to entangle the two auxiliary qubits A and B, thereby encoding a measurement value for the compound stabiliser 612 across the two auxiliary qubits A and B. Violating condition (b) above therefore entangles the auxiliary qubits 204 without directly applying any gate between them—this has the benefit that complex stabilisers (such as the compound stabiliser 612), including those required for lattice surgery, can be performed on a device with uniform degree-four connectivity.

In order to obtain a measurement value for the compound stabiliser 612, the measurement outcomes $m_A$ and $m_B$ associated with the auxiliary qubits A and B respectively are combined to obtain a compound measurement outcome associated with the compound stabiliser measurement 612. In particular, the mod 2 sum of the measurement outcomes $m_A$ and $m_B$ gives the compound measurement outcome of the compound stabiliser measurement 612.

The set of entangling operations associated with the first stabiliser component 612*a* is equivalent to a collective controlled operator labelled as a controlled-P operation in FIG. 7*b*, and the set of entangling operations associated with the second stabiliser component 612*b* is equivalent to a collective controlled operator labelled as a controlled-Q operation in FIG. 7*b*, and the correction on the data qubits 202 is equivalent to $\sqrt{Q}Q^{m_B}$, where $$\sqrt{Q} = \frac{1}{\sqrt{2}}(1 + iQ).$$

Figure 7C:
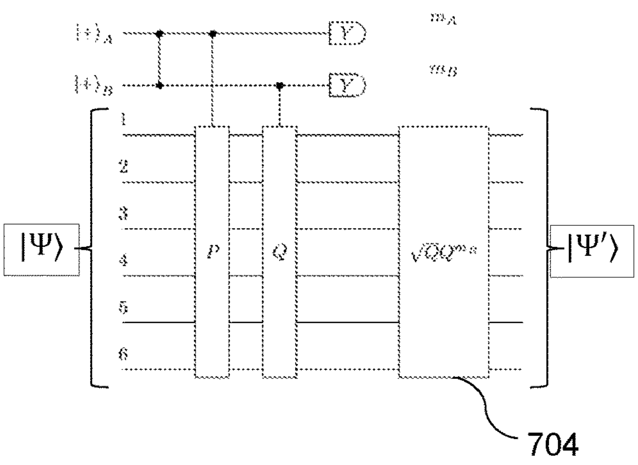

A simplified circuit diagram representing the same circuit as FIG. 7*b* is shown in FIG. 7*c*. The state $|\Psi\rangle$ in FIGS. 7*a-c* represents the logical state encoded in the data qubits 202. While FIGS. 7*a-c* only show 6 data qubits, one skilled in the art will appreciate that the logical state $|\Psi\rangle$ will generally be encoded in additional data qubits 202 as well as the six data qubits 202 shown in FIGS. 7*a-c*. By calculating the effect of the controlled-Z gate 706 and the controlled operations P and Q, the following can be ascertained:

(i) the output state $|\Psi'\rangle = (\mathbb{1} + (-1)^{m_A+m_B} QP)|\Psi'\rangle$ (up to an irrelevant global phase), which is stabilised by QP or −QP ($|\Psi\rangle$ may not be equal to $|\Psi\rangle$ because $|\Psi\rangle$ may not have been stabilised by QP or −QP).

(ii) the measurement outcome of the compound stabiliser 612 is equal to the mod 2 sum of the measurement outcomes $m_A$ and $m_B$.

The individual stabiliser components 612*a* and 612*b* are not themselves stabilisers, and they should therefore not be measured; measurement of the auxiliary qubits in the Y basis ensures measurement values of the individual stabiliser components 612*a* and 612*b* are not observed. In other words, although measuring the auxiliary qubits 204 provides measurement outcomes associated with the stabiliser components, the measurement outcomes do not represent the actual value of the stabiliser components.

The correction $\sqrt{Q}Q^{m_B}$ is an element of the quantum computing Clifford group. Repeated application of the circuit in FIG. 7*a* results in a combined correction $QQ^{m_B+m_{B'}}$, where $m_{B'}$ is the measurement outcome of auxiliary qubit B during the second application of the circuit.

This combined correction is a Pauli operation and is generally easier to track in software than Clifford operations (in other words, the combined Pauli correction operation does not need to be applied to the data qubits 202: it can instead be tracked by a classical computer during the quantum computation and used to correct any logical qubit measurements). Consequently, it may be desirable to repeat the circuit of FIG. 7*a* to obtain a Pauli correction rather than attempting to track or apply a Clifford correction.

In general, the central column of four data qubits 202 in FIG. 6*c* (those on which there is a Pauli-Y term in the compound stabiliser) can be prepared in the Y-basis prior to measuring the compound stabilisers 608, 610, 612. As Y-measurements on these data qubits commute with the compound stabilisers 608, 610, 612 and all other stabilisers, these Y-measurements are themselves stabilisers. Accordingly, these data qubits are preferably measured individually in the Y-basis after alternating rounds of compound stabiliser measurement and the measurement outcomes provided to the decoding system 102 as part of the error syndrome (these Y-measurements are only performed after even numbers of rounds of compound stabiliser measurement because they are affected by the Clifford corrections). These data qubits could alternatively be measured in the Y-basis after every round of compound stabiliser measurements if the Clifford correction is applied to the qubits after each round.

Figure 8A:
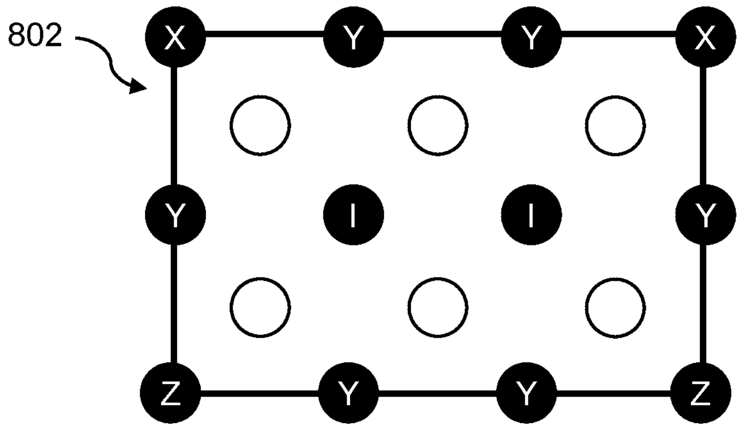
FIGS. 8*a* and 8*b* show a compound stabiliser and associated gate schedule respectively; and, FIG. 9 illustrates a method of performing a compound stabiliser measurement operation in a quantum error correction procedure.
Figure 8B:
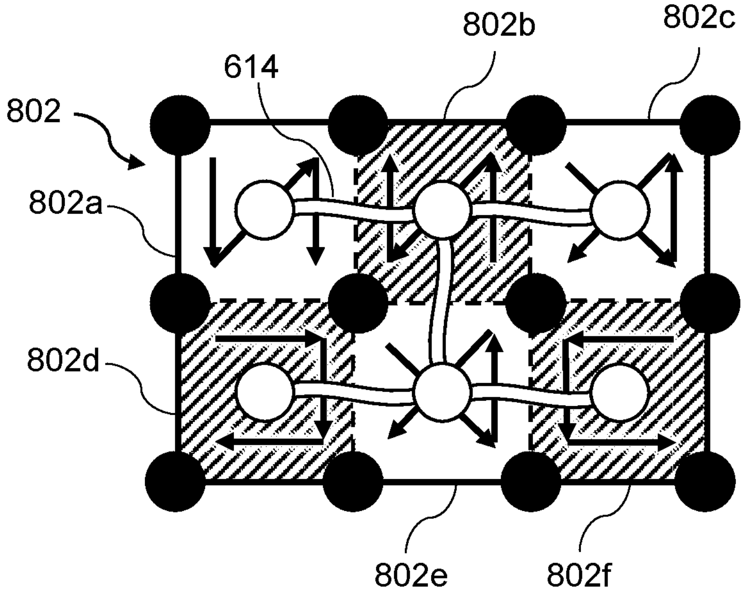

It should be noted that the method disclosed herein can be extended to compound stabilisers that involve an arbitrary number (i.e. more than two) stabiliser components. An example of such a compound stabiliser 802 is shown in FIG. 8*a*, which involves performing a joint Pauli involving twelve data qubits 202 using six auxiliary qubits 204 (and therefore six stabiliser components). An example of a suitable schedule for measuring this compound stabiliser 802 is shown in FIG. 8*b*, in which six stabiliser components 802*a-f* are shown. It can be seen that the operations of neighbouring stabiliser components 802*a* and 802*d* do not violate condition (b) above. Accordingly, there is no connecting line 614 between the auxiliary qubits associated with these stabiliser components. Similarly, the operations of neighbouring stabiliser components 802*c* and 802*f* likewise do not violate condition (b).

Once the auxiliary qubits 204 have been measured, the outcomes can once again be combined to obtain a compound measurement outcome for the compound stabiliser measurement, and a suitable correction to logical quantum state can be determined based upon at least a subset of the measurement outcomes.

The number of stabiliser components will generally depend upon the lattice surgery operation in question. In addition, the method of the present disclosure is not limited to lattice surgery operations and can be used in any context where high-weight stabiliser measurements are required on device with limited connectivity.

Figure 9:
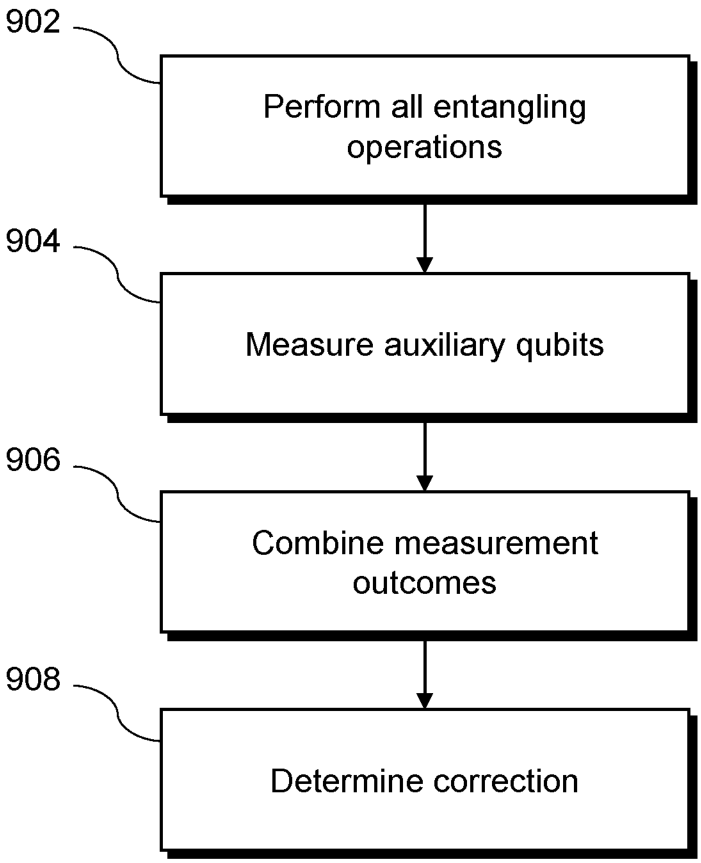

FIG. 9 shows a method for performing a compound stabiliser measurement according to the present disclosure. As explained above, the compound stabiliser measurement is formed of a set of at least two stabiliser components (i.e. operators that are not stabilisers of a quantum error correction procedure but can be multiplied together to form the compound stabiliser, which is itself a stabiliser of the quantum error correction procedure). In step 902, the entangling operations associated with first and second stabiliser components are performed such that they violate condition (b) above. In other words, for an odd number of pairs of non-commuting operations associated with the first and second stabiliser component, a first entangling operation associated with the first stabiliser component is performed prior to the non-commuting second entangling operation associated with the second stabiliser component. For all other pairs of non-commuting operations associated with the first and second stabiliser components, the first entangling operation associated with the first stabiliser component is performed subsequent to the non-commuting second entangling operation associated with the second stabiliser component. The entangling operations in step 902 are performed on the qubits 106 of the quantum computing system 100 controlled by the control system 104.

In step 904, the auxiliary qubits associated with the stabiliser components are measured to obtain respective measurement outcomes associated each stabiliser component. The measurements in step 904 are performed on the qubits 106 of the quantum computing system 100 controlled by the control system 104. Depending upon the configuration of stabiliser components in the compound stabiliser, the measurement basis and measurement outcomes may need to be adjusted. For a given gate schedule, each stabiliser component will be performed such that its entangling gates are non-commuting with the entangling gates of either an even number or odd number of other stabiliser components (indicated by either an odd or even number of lines 614 connecting the respective auxiliary qubit 204 to other auxiliary qubits 204); this is referred to as the degree of the stabiliser component (not to be confused with the connectivity of the qubits in the QPU). In other words, the degree of a given stabiliser component is equal to the number of other stabiliser components which have a "tangled schedule" with it, where a tangled schedule means that the non-commuting entangling gates are performed in violation of condition (b) above. For example, the auxiliary qubit for a given stabiliser component should be measured in the Y basis if the degree of the stabiliser component is odd, otherwise it should be measured in the X basis. Similarly, if the modulo 4 degree of the stabiliser component is 2 or 3, then the corresponding outcome should be flipped classically (i.e. a 0 outcome should be changed to a 1 outcome and vice-versa). One skilled in the art will appreciate that corresponding operations could potentially be achieved using different operations and bases, and such a person will be able to determine suitable measurement operations for the compound stabiliser configuration in question without undue burden.

In step 906, the measurement outcomes associated with the stabiliser components are combined at a classical computing component of the quantum control system 100 (such as the control system 102) to obtain a compound measurement outcome associated with the compound stabiliser measurement. In particular, the compound measurement outcome can be obtained by taking the module 2 sum of the measurement outcomes associated with the stabiliser components.

In step 908, a correction is determined at the classical computing component of the quantum control system 100 (such as the control system 102) based on at least one of the measurement outcomes. The correction may either be tracked in software, or it could alternatively be applied to the logical state. Steps 902 and 904 may optionally be repeated prior to step 908 to obtain respective additional measurement outcomes associated with each stabiliser component, and the correction may be further based on at least one of the respective additional measurement outcomes.

It should be understood that the correction described above is distinct from any error corrections that may be determined by the decoding system 102. In particular, the correction described above is a direct result of the way in which the compound stabiliser measurements are performed. The obtained compound measurement outcome is preferably provided to the decoding system 102 (e.g. as part of a complete syndrome obtained from measuring all stabilisers) for decoding errors on the plurality of data qubits using any conventional means (such as minimum weight perfect matching, union-find etc.). The decoded error may optionally be used to infer an error correction operation, or, more likely, tracked in software and used to correct any logical measurements made later in the quantum computation.

The method of the present disclosure may be provided as a computer program product comprising instructions which, when the program is executed by a quantum computing system, cause the quantum computing system to carry out the method of any preceding claim. The computer program product may be on a computer-readable storage medium (e.g. a non-transitory computer-readable storage medium). The computer program may also be provided as instructions for hardware products such as field-programmable gate arrays (FPGAs) or application-specific integrated circuits (ASICs) (e.g. FPGAs and/or ASICs of decoding systems and control systems of a quantum computer).

Unless indicated otherwise or technically infeasible, one or more steps of any method described herein may be omitted (i.e. such steps may be considered optional and do not necessarily need to be performed) and/or performed in a different order (i.e. the order of such steps may be changed).

Unless indicated otherwise, the terms "first" and "second" used herein do not imply any spatial or temporal ordering: these terms are merely used as labels to distinguish different features.

The invention claimed is:

1. A computer-implemented method of performing a compound stabiliser measurement operation in a quantum error correction procedure performed on a quantum computing system, wherein the quantum error correction procedure encodes a logical quantum state in a plurality of data qubits of the quantum computing system, wherein the compound stabiliser measurement comprises a plurality of stabiliser components each associated with a respective auxiliary qubit of the quantum computing system, the plurality of stabiliser components including first and second stabiliser components, wherein the first and the second stabiliser components comprise entangling operations, each entangling operation involving one data qubit of the plurality of data qubits and the respective auxiliary qubit associated with a respective one of the first and the second stabiliser components, wherein the entangling operations comprise pairs of non-commuting entangling operations, each pair of non-commuting entangling operations comprising a first entangling operation associated with the first stabiliser component and a second entangling operation associated with the second stabiliser component, wherein the method comprises, at the quantum computing system:

performing all of the entangling operations such that:

for an odd number of pairs of non-commuting operations, the first entangling operation associated with the first stabiliser component is performed prior to the second entangling operation associated with the second stabiliser component; and for all other pairs of non-commuting operations, the first entangling operation associated with the first stabiliser component is performed subsequent to the second entangling operation associated with the second stabiliser component, subsequent to performing all of the entangling operations, measuring the respective auxiliary qubit associated with each of the plurality of stabiliser components to obtain a plurality of respective measurement outcomes;

combining the plurality of respective measurement outcomes at a classical computing component of the quantum computing system to obtain a compound measurement outcome associated with the compound stabiliser measurement; and determining, at the classical computing component, a correction to the logical quantum state based on at least one respective measurement outcome of the plurality of respective measurement outcomes.

2. The method of claim 1, further comprising:

providing the compound measurement outcome to a decoding system of the quantum computing system for decoding errors on the plurality of data qubits.

3. The method of claim 1, wherein:

the plurality of stabiliser components includes a third stabiliser component, the third stabiliser component comprises further entangling operations, each further entangling operation involving one data qubit of the plurality of data qubits and the respective auxiliary qubit associated with the third stabiliser component;

the entangling operations and further entangling operations collectively comprise further pairs of non-commuting entangling operations, each further pair of non-commuting entangling operations comprising a first further entangling operation associated with the first component and a second further entangling operation associated with the third stabiliser component, and the method further comprises performing all of the further entangling operations such that:

for an odd number of pairs of further non-commuting operations, the first further entangling operation associated with the first stabiliser component is performed prior to the second further entangling operation associated with the third stabiliser component; and for all other pairs of further non-commuting operations, the first further entangling operation associated with the first stabiliser component is performed subsequent to the second further entangling operation associated with the third stabiliser component.

4. The method of claim 1 wherein combining the plurality of respective measurement outcomes comprises summing, at the classical computing component, the plurality of respective measurement outcomes.

5. The method of claim 1, wherein the data qubits and auxiliary qubits are arranged in the quantum processing system having uniform degree-four connectivity.

6. The method of claim 1 wherein the quantum error correction procedure is a surface code error correction procedure.

7. The method of claim 1 wherein the quantum error correction procedure is a lattice surgery procedure.

8. The method of claim 1 wherein the entangling operations are two-qubit operations.

9. The method of claim 1 wherein the correction comprises a Clifford operation.

10. The method of claim 1 wherein the correction comprises a Pauli operation.

11. A computer program product comprising instructions which, when the program is executed by a quantum computing system, cause the quantum computing system to carry out the method of claim 1.

12. A computer-readable storage medium having stored thereon the computer program product of claim 11.

13. A quantum computing system comprising a plurality of qubits and a classical computing component, wherein the quantum computing system is configured to perform the method of claim 1.

* * * * *